Nov. 15, 1960 T. A. BANK 2,959,817
APPARATUS AND METHOD OF MANUFACTURING RUBBER ARTICLE
Filed Dec. 6, 1956 3 Sheets-Sheet 1

INVENTOR.
THOMAS A. BANK
BY
W. A. Fraser
ATTY.

Nov. 15, 1960 T. A. BANK 2,959,817
APPARATUS AND METHOD OF MANUFACTURING RUBBER ARTICLE
Filed Dec. 6, 1956 3 Sheets-Sheet 2
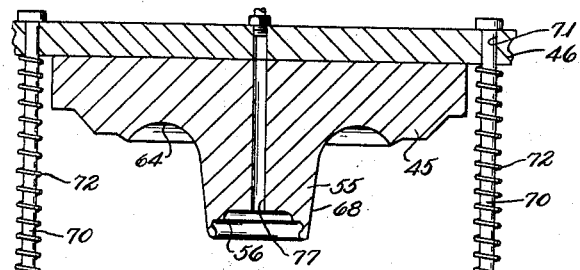
FIG. 4
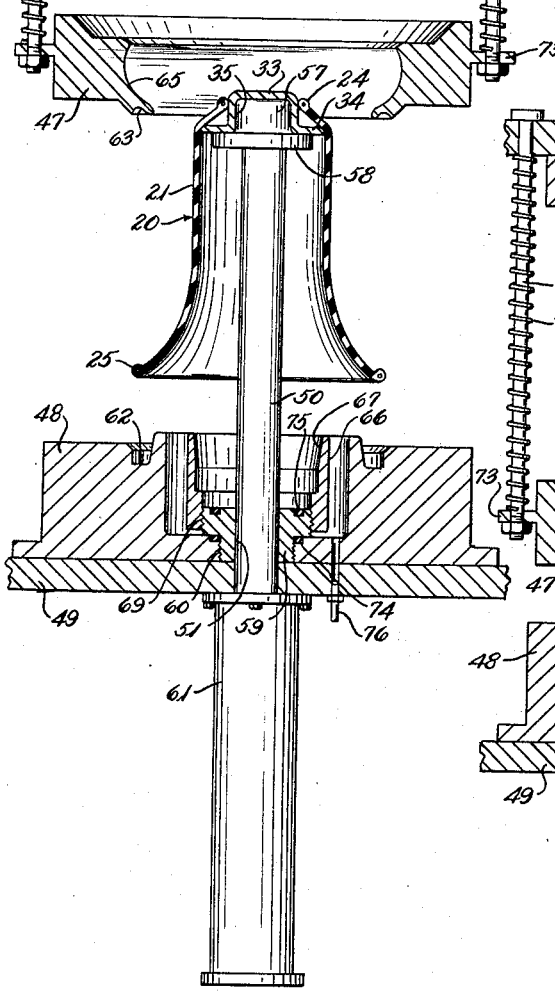
FIG. 5
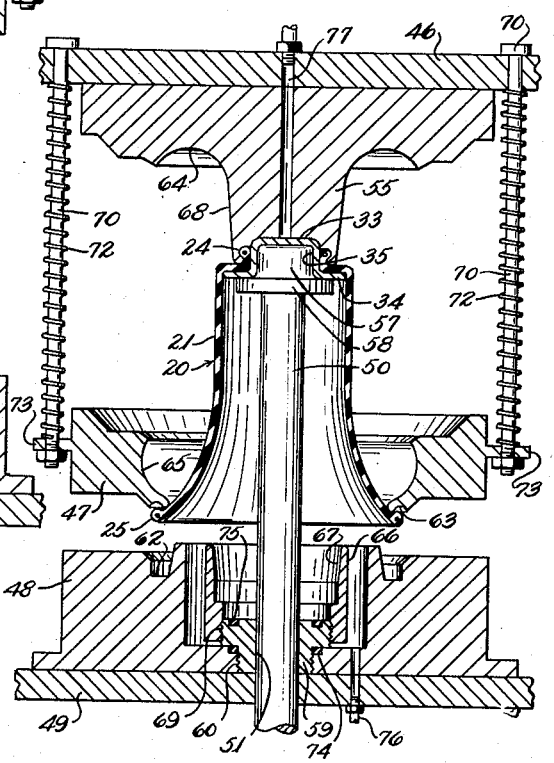
INVENTOR.
THOMAS A. BANK
BY *W. A. Fraser*
ATTY.

Nov. 15, 1960 T. A. BANK 2,959,817
APPARATUS AND METHOD OF MANUFACTURING RUBBER ARTICLE
Filed Dec. 6, 1956 3 Sheets-Sheet 3

INVENTOR.
THOMAS A. BANK
BY
W. A. Fraser
ATTY.

United States Patent Office 2,959,817
Patented Nov. 15, 1960

2,959,817
APPARATUS AND METHOD OF MANUFACTURING RUBBER ARTICLE

Thomas A. Bank, Indianapolis, Ind., assignor to The Firestone Tire & Rubber Company, Akron, Ohio, a corporation of Ohio Filed Dec. 6, 1956, Ser. No. 626,678

5 Claims. (Cl. 18—35)

This invention relates to resilient bellows known as air springs and more particularly to an improved air spring for use in vehicle suspensions and to an improved apparatus and method for manufacturing such air springs.

A number of modern vehicle suspensions employ pneumatic bellows known as air springs to cushion road shocks. Such air springs contain air under pressure and they take up the wheel shocks in a manner which depends upon the changing effective area of the air springs and the changing air pressure within the air springs as they deflect.

A particularly effective air spring for vehicle suspensions takes the form of a single convolution bellows terminating at one end in a relatively large open bead and at the other end in an end structure which is capable of passing through the large bead in a telescoping movement when the air spring is compressed.

Such an air spring in neutral or mid-position will have its single convolution wall bulging outwardly to a considerably greater diameter than the diameter of the large bead. But as the air spring compresses to take up severe road shocks the convolution will be forced inwardly and up through the large open bead of the air spring. The material making up the major portion of the convolution wall is thus pulled from a diameter considerably larger than the large bead to a diameter which is considerably smaller; and as a result of this decrease in diameter, circumferential compression forces are set up in the convolution wall. Since the wall is of flexible material, it will react to these compression forces by wrinkling and folding in a longitudinal direction. As the air spring flexes repeatedly in service the wrinkles and folds resulting from the telescoping movement will often result in cracking and premature failure of the bellows. If the wrinkling is severe, the life of the air spring may be so short as to render it unfit for commercial use.

The present invention solves this problem of wrinkling by molding an air spring in such a manner as to place the convolution wall of the air spring under circumferential tension throughout most of the working stroke of the air spring. The tension which is thus induced has been found to be sufficiently great to effectively neutralize the circumferential compression forces which would otherwise be set up in the air spring. With the present invention, the telescoping movement of the air spring in most cases merely results in a lessening of the tension in the air spring wall. It is only in the most severe deflections of the air spring that the tension is overcome, and even in such cases the compressive force will be limited to values below those which would cause wrinkling of the wall of the air spring.

Specifically, this result is achieved by molding the air spring with the small end of the air spring extending through the large open bead so that the air spring in the as-molded condition is either fully or almost fully telescoped. During the molding operation the cords will assume a position which is stress-free, at least so far as circumferential stresses are concerned; and the rubber surrounding the cords will flow and likewise become stress-free. That portion of the convolution wall which undergoes the radical changes in diameter during the working stroke of the air spring will thus be molded stress-free in very nearly the smallest diameter that it will assume in service. Since the changes that it will undergo in service will, in almost all cases, be toward larger diameters, these changes will place it in circumferential tension rather than in circumferential compression.

This concept of molding is utterly different from that which has been heretofore practiced in the art. The conventional method is to mold an air spring in about its neutral or midposition. With the use of this new molding technique, the service life of such air springs has been materially extended. Surprisingly such an air spring also provides better ride characteristics than one molded in the usual manner. With such air springs, natural frequencies as low as 35 to 40 cycles per minute have been obtained whereas in the prior air springs of corresponding design the lowest frequencies are in the order of 50 cycles per minute.

A general object of the invention therefore is to provide an air spring which has little or no tendency to wrinkle when the air spring is compressed.

Another object is to provide an air spring having a long service life.

Another object is to provide an air spring having an inherently low natural frequency.

Another object is to provide an air spring whose convolution wall will be under substantial circumferential tension throughout a large portion of the telescoping stroke of the air spring.

Another object is to provide an air spring which in the as-molded condition of the air spring has one end telescoped through the open bead of the other end for an appreciable distance.

Yet another object is to provide a method of manufacturing an air spring which comprises molding the air spring with a considerable portion of its wall extended in telescoping fashion through one of the beads of the air spring.

A further object is to provide a mold which will operate to transform a tubular air spring into a telescoped shape during the closing of the mold.

A further object is to provide a mold for such air springs which is economical to manufacture and maintain and which is simple and effective in design.

Further objects and advantages will be more fully apparent from the following description of the invention, reference being had to the accompanying drawings in which:

Figures 4–7 are somewhat diagrammatic views showing in successive steps the manner in which an air spring is shaped and cured according to the method of and in a mold embodying the invention.

While the invention will be described with reference to an air spring which is most useful in an automobile wheel suspension, the invention has equal advantages for air springs which are used in other vehicle suspensions such as for trucks, buses and off-the-road vehicles, as well as railroad suspensions and shock mountings of all sorts. It is not intended that the invention shall be limited to the particular type of air spring nor to the specific wheel suspension described. So long as an air spring undergoes a telescoping deflection when it is compressed, it will be advantageous to use the apparatus and method of molding described herein.

Figures 1, 2, 3:
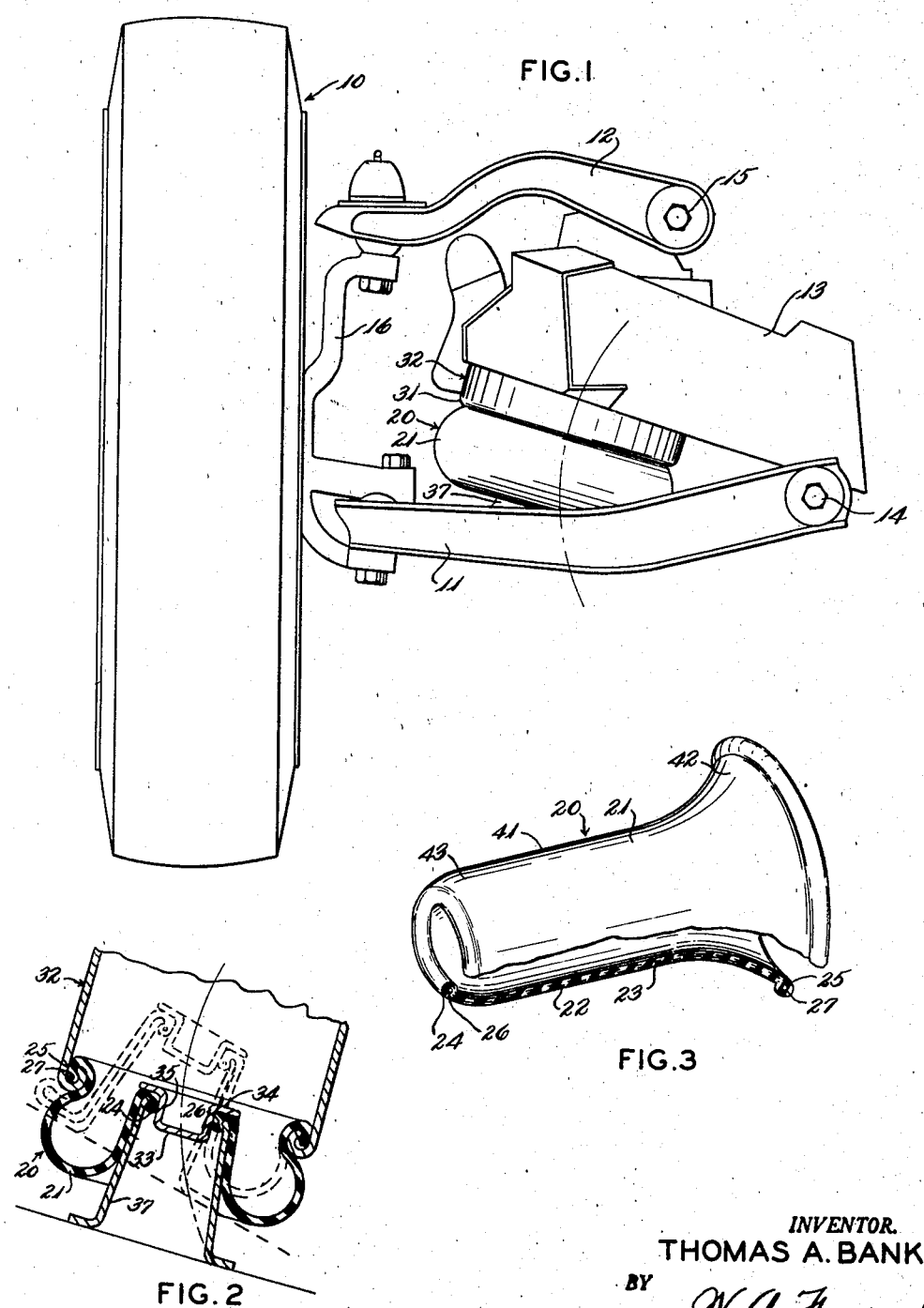
Figure 1 is a front elevation of an air spring embodying the invention assembled in an automobile front wheel suspension.
Figure 2 is a longitudinal sectional view on a somewhat larger scale than Figure 1 showing the air spring of Figure 1 in its as-molded condition.
Figure 3 is a longitudinal sectional view of an unvulcanized air spring just after it is removed from a building drum and prior to the molding operation which produces the air spring of Figure 2.
Figure 6:
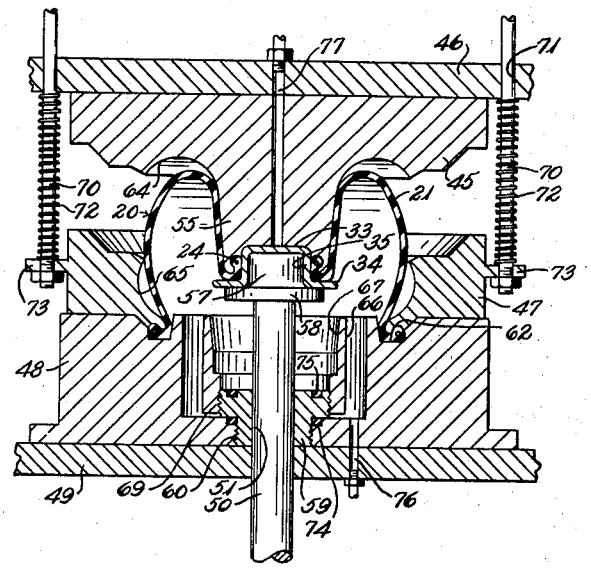

Now referring to the drawings, a typical wheel suspension for the right front wheel 10 of an automobile, as shown in Figure 1, comprises a pair of arms 11 and 12 which are suspended from the frame 13 of the automobile at pivot points 14 and 15, respectively. The wheel 10 is journalled on a spindle (not shown) which is supported by a member, indicated generally at 16, which in turn is secured to the outer ends of arms 11 and 12. This suspension so far as it has been described is conventional and need not be described in further detail.

When the wheel 10 encounters a bump in the road, it will move upward and inward in an arcuate path indicated approximately by the dot-dash line in Figure 1, this movement being permitted by the pivoting of the arms 11 and 12 about their pivot points, with arm 11 moving upward toward the frame 13. This movement of the wheel is cushioned by a single convolution air spring, embodying the present invention, which is indicated generally at 20 and which is positioned between the lower arm 11 and the frame 13 of the automobile.

The air spring 20 will usually contain air under operating pressures of about 50–150 pounds per square inch and it is designed to take a neutral position as shown in the solid lines of Figures 1 and 2. If the front wheel encounters a pronounced bump on the road the air spring will become compressed and the lower bead 24 will be forced upwardly through the larger bead 25 to take a position such as that shown in dotted lines in Figure 2. As the air spring goes from the solid line position to the dotted line position of Figure 2, the effective area of the air spring decreases and at the same time the air pressure within the air spring increases in such a manner as to provide a desirable spring rate.

Such an air spring 20 preferably comprises a body 21 of two plies, 22 and 23, of rubberized fabric, the fabric being essentially weftless and having cords which extend at an angle of about 15° to the axis of the air spring with the cords of one ply crossing the cords of the other. The interior of the bellows has an air-retaining lining of rubber, preferably neoprene because of its oil resistant properties. The ends of the plies 22 and 23 are wrapped about and anchored to a pair of circular steel wire cores 24 and 25 to form beads 24 and 25, respectively.

Preferably, the top bead 25 has a shape in cross-section such as that shown in Figure 2, similar to the bead of a pneumatic tire, which can be positioned in place on a radial flange 31 of the structure 32 which secures the air spring to the frame 13 of the automobile. This manner of mounting bead 25 is analogous to the manner in which a tire is mounted on a conventional drop center automotive rim. The bottom bead 24 is mounted so that it will move with the arm 11 and the wheel 10, and this is accomplished by an arrangement consisting of a metal cup 33, having a radial flange 34 and a sidewall 35 which are vulcanized to the end face and inside diameter of bead 24, and a tubular stud member 37 which is fixed to arm 11 and which snaps around the small bead 24 to clamp it against the cup 33 as shown in Figure 2. The member 37 and air spring 20 are retained in assembled position by the inflation pressure within the air spring and by the normal forces of operation.

To permit the telescoping movement of the air spring, bead 25 has an inside diameter of 5 inches while bead 24 has an outside diameter of 3 inches, a difference which provides sufficient clearance for the bead 24 to pass readily through the large bead, even when bead 24 moves through an arcuate path as indicated in Figures 1 and 2. Obviously structure 32 has sufficient depth to allow the lower bead 24 to enter the structure in the compression portion of the working stroke and to take the position shown by the dotted lines in Figure 2.

The air spring 20 is manufactured by assembling its components on a building drum by methods similar to those used in building conventional air springs, the only differences being those made necessary by the different diameters of beads 24 and 25. The air spring, as it is removed from the building drum, is somewhat bell-shaped in form, see Figure 3, having a substantially cylindrical portion 41 which merges at one end with a concavely flaring portion 42 terminating in the large bead 25 and which merges at the other end in a contracted portion 43 terminating in the small bead 24.

The mold for shaping and vulcanizing such a "green" air spring comprises four separable parts which cooperate during their closing movement to bring the air spring into the required telescoped position for vulcanization. These parts are a top end section 45 which is affixed to the ram 46 of a vulcanizing press, an intermediate section 47 which is also supported by the ram of the press, a bottom end section or base 48 which is fixed to the platen 49 of the press and finally a plunger 50 which is mounted to move axially through a central bore 51 in the bottom mold section and into cooperative engagement with the top section 45.

The top mold section 45 is characterized by a large downwardly extending and slightly tapered central boss 55 which is recessed as indicated at 56 to receive the small bead 24 and the metal cup 33. The boss 55 cooperates with the plunger 50 in such a manner as not only to mold the bead 24 of the air spring but also to produce the telescoping of the air spring as the mold closes. In order to support the metal cup and the small bead 24 for the molding operation, the plunger 50 has an enlarged head 57 which fits within the metal cup and has a radial flange 58 which supports the flange 34 of the cup 33. The plunger 50 has a vertical sliding movement within a bearing member 59 which is threaded as at 60 or otherwise suitably mounted in the bore 51 of the base section 48. The movement of the plunger is preferably controlled in a conventional manner by a pneumatic cylinder 61 although any other suitable motive means may be used.

The large bead 25 is molded between an annular grooved surface 62 in the base section and a complementary grooved surface 63 in the intermediate mold section. The convolution wall of the air spring is shaped by suitably formed molding surfaces 64 and 65 in the top and intermediate sections respectively.

In order to insure positive molding of the convolution wall of the air spring adjacent to the small bead 24, the base section is provided with a cylindrical sleeve 66 having an inward tapering surface 67 complementary to the tapered surface 68 of the boss 55, the convolution wall portion being positively clamped and molded between these two surfaces. In the present example, the sleeve 66 is threadedly secured, as indicated at 69, to the plunger bearing member 59, a construction which permits ready adjustment of the clearance between the molding surfaces 67 and 68 of the sleeve 66 and boss 55. It will be noted that the boss is long enough to extend a substantial distance beyond the intermediate mold section when the mold is closed to insure the required degree of telescoping of the air spring in the molding operation.

As will be apparent later, in order to control the shaping of the air spring during the molding operation, it is desirable to inflate the air spring with steam under pressure as the air spring is first collapsed axially and then later telescoped into its final form. To do this, it is necessary to provide a fluid tight construction as by the use of gaskets 74 and 75 and also to provide fluid-tight seals at the small bead 24 and large bead 25 early in the molding operation. The seal at the small bead 24 is provided by the bead being clamped between the boss 55 and the plunger 50 shortly after the mold begins to close. At about the same time, or preferably shortly thereafter, a fluid-tight seal is created at the large bead 25 by clamping it between the surfaces 62 and 63 in the intermediate section and the base.

Figure 7:
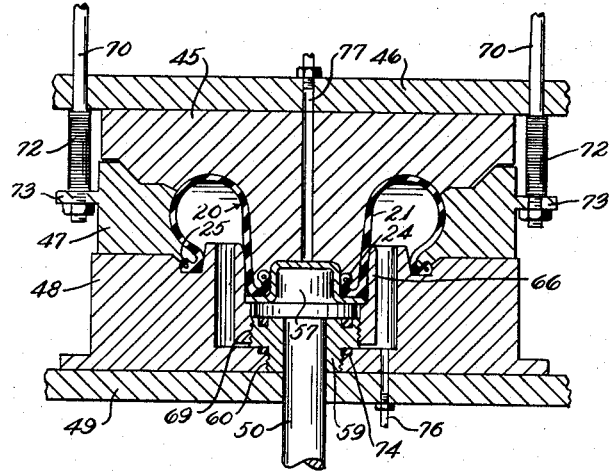
Figure 8:
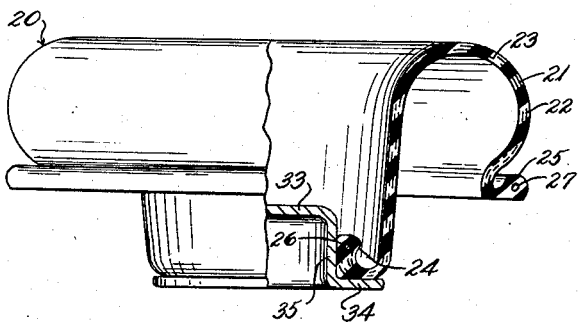
Figure 8 is a longitudinal sectional view of an air spring in the as-molded condition.

To facilitate this early clamping of bead 25 before the mold is closed, the intermediate section 47 is suspended from the ram of the press by resilient means which enables the intermediate section to clamp the bead and then remain in place while the top section is lowered into closed position. Such resilient means comprises a plurality of bolts 70 which are slidable through holes 71 in the ram of the press. Each bolt has a coil spring 72 confined between the ram of the press 46 and a radial flange 73 forming an integral part of or being otherwise secured to the intermediate section 47 as best shown in Figures 4–7. When the press is fully open as in Figure 4, the intermediate mold section hangs from the ram with its position determined by the length of the bolts 70. After the intermediate mold section clamps the bead 25 against the base of the mold, continued downward movement of the ram causes the ram and the top section to move downwardly relative both the intermediate mold section and base section, see Figure 6, with the bolts 70 sliding up through the ram of the press, this relative movement being permitted by the compression of the coil springs 72 and continuing until the press is fully closed as shown in Figure 7.

Initially the mold sections are spaced apart in about the relationship shown in Figure 4 with the top section 45 and intermediate section 47 raised from the bottom section 48 to enable the unvulcanized air spring 20 to be slipped over the head 57 of the plunger 50 which is raised to its uppermost position. At this moment the unvulcanized air spring 20 and the flanged cup 33 are loosely assembled with the cup fitting upon the head of the plunger. The initial position of the intermediate section is determined by the adjustment of the bolts 70 and springs 71 described above.

The ram of the press is then lowered until the recessed end of the boss 55 contacts the small bead 24 of the air spring and the metal cup 33 and clamps them together against the head of the plunger with a force sufficient to produce a fluid-tight seal. As the ram of the press continues to descend, it forces the plunger 50 downwardly toward the base section, the plunger movement being resisted by the pneumatic cylinder 61 which controls the movement of the plunger and determines the force with which the bead structure 24 is clamped between the top section and the plunger during the closing of the mold.

Shortly after the small bead 24 is clamped against the plunger, the continued lowering of the ram will cause the large bead 25 to contact the bead molding groove 62 in the base section and immediately after that, the intermediate section 47 will strike the large bead and clamp it against the base section to create a fluid-tight seal. The force initially exerted on bead 25 is the sum of the weight of section 47 and the compression forces exerted by the springs 71. These forces are sufficient to produce a tight seal at bead 25 and from this moment on, the air spring and the mold sections form a fluid-tight enclosure.

Up to this point the air spring has undergone virtually little or no change in shape but from this point on, the closing movement of the press produces an increasing axial collapse of the air spring. Therefore, as soon as the two beads are clamped, air or steam under pressure is introduced into the interior of the air spring by means of a suitable conduit such as the passage 76 extending through the bottom section 48. The steam partially inflates the air spring as it is collapsed and thus prevents wrinkling and folding of the air spring wall. As the mold continues to close, the small bead 24 of the air spring is forced by the boss 55 in a telescoping movement through the large bead 25 of the air spring. When the ram has completed its downward stroke, the mold will be fully closed and the air spring will have the position shown in Figure 7 with the steam pressure inflating it tightly against molding surfaces 63 and 64.

In the final closing movement of the press, the wall portion 43 of the air spring immediately adjacent the small bead will be positively shaped between the sleeve 65 and the boss 55. It is desirable to mold this portion by positive means so as to iron out any wrinkles that may have been formed in the fabric plies in the building operation. This is important because it is this portion of the air spring that undergoes the most severe flexing in the operation of the air spring. The remainder of the air spring wall is forced into contact with the mold by the force of the internal steam pressure alone which is preferably in the order of 170 pounds and at a temperature of 375° F. In the final closing of the mold, additional molding pressure is exacted on beads 24 and 25 to insure their taking their proper shapes.

After vulcanization is complete, the press is opened to separate the mold sections, but the plunger 50 will be held in its lowered position in the base section. As the ram of the press is raised, the air spring will strip free of the base section and plunger and will be retained in position on the boss of the top mold section. After the mold is completely opened, a slight tug at the air spring will serve to strip the air spring from the mold. Alternatively air under pressure can be introduced through the passage 77 in the top section to blow the air spring off the mold. The plunger 50 is then returned to its raised position of Figure 4 ready for another vulcanizing cycle. In the particular example described, the small bead 24 should extend through and beyond the large bead 25 by a distance of about 1¼ inches; this is about 3 inches short of the position of the small bead 24 when the air spring is fully compressed. The exact position of bead 24 is not critical for so long as an appreciable portion of the air spring is in telescoped position, the advantages of the invention will be realized. While not shown, the mold sections are preferably hollow so that they can be heated with steam in a conventional manner.

The advantages of vulcanizing the air spring 20 with a major portion of its fabric body in the form of a cylinder extending in telescopic fashion through the open bead 25 can be best appreciated by considering what happens to an annular element x adjacent the greatest bulge of the convolution when the air spring is compressed.

When the air spring is mounted in an automobile suspension, as shown in Figures 1 and 2 and when the air spring is in neutral or mid-position the element x may have a diameter of say 5½–6 inches. Now as the air spring is compressed in service element x will decrease to a diameter of about 4 inches for an intermediate position of the air spring, and finally element x will take its smallest diameter of 2¾ inches for the extreme compressed position of the air spring.

The diameter of element x thus decreases from midposition to compressed position by amounts up to 100%, and as a result, circumferential compressive forces tend to be set up in element x and corresponding forces will be set up in every other annular element of the air spring that undergoes similar changes in diameter.

In an air spring molded in the conventional manner these compressive forces may exceed the counteracting force of the internal air pressure, and if they do, wrinkles will form in the wall of the air spring each time the air spring is compressed and premature failure of the air spring will result after it has undergone only a relatively few compression cycles.

The present invention overcomes this difficulty by molding the air spring so that the air spring wall is normally under tension for practically all positions of the air spring. Thus with the air spring molded in the telescoped shape just described, element $x$ will have a normal diameter of say 3 inches and the element $x$ in this position will be unstressed because it will have been relieved of stresses during vulcanization. Whenever the air spring returns to its molded diameter it will be essentially stress free, except for the effect of internal air pressure which will cause it to be under some circumferential tension. The result is that the body of the air spring when shaped and vulcanized in this fashion is under circumferential tension for almost all positions of deflection. The tension in element $x$ will be at a maximum for the neutral or mid-position of the bellows and will decrease to a minimum for fully compressed positions of the air spring. By thus controlling the stress state in a circumferential direction in the air spring, wrinkling of the air spring wall is prevented and an air spring capable of a long and useful service life is obtained.

While a preferred form of the invention has been described, various modifications and changes will no doubt occur to those skilled in the art within the scope of the invention, the essential features of which are summarized in the appended claims.

What is claimed is:

1. The method of shaping and vulcanizing an air spring initially comprising a tubular body of flexible, vulcanizable material terminating at one end in a large open bead and at the other end in a relatively small end portion, which comprises sealing said air spring to form a closed chamber, collapsing said air spring axially by forcing said small end portion toward and through said large open bead for a substantial distance reversing the wall of said body upon itself, while introducing fluid under pressure into said air spring to inflate it in a radially outward direction, supporting said air spring externally by molding surfaces at the conclusion of said collapsing movement and thereafter vulcanizing said air spring by introducing heated fluid under pressure to the interior of said air spring to force said air spring against said supporting surface.

2. Apparatus for shaping and vulcanizing an air spring, which in its pre-vulcanized form has a flaring body of flexible, vulcanizable material terminating at one end in a relatively large bead and at the other end in a bead having a diameter substantially smaller than said large bead, said apparatus comprising first and second mold sections, and an intermediate mold section between said end sections, said end mold sections having relative axial movement whereby they may be moved toward each other in a closing movement to exert pressure on and to collapse said air spring axially, said first mold end section and said intermediate mold section having cooperating annular molding surfaces to mold the external surfaces of said large bead, said second mold end section having annular molding surfaces to shape and mold said small bead, means to bring said first and intermediate mold sections together to clamp and seal said large bead between said first annular molding surfaces, and to bring said second mold end section into forcible engagement with said small bead to initiate the axial collapse of said air spring, and to move the bead-engaging surfaces of said second end section axially through said intermediate section, means extending into said mold from said first end section to engage and support said small bead and force it against the annular molding surfaces of said second section, and means to apply fluid pressure to the interior of said air spring as said axial collapse progresses, whereby to expand the wall of said air spring outwardly during the closing movement of said mold sections and to force it against the surfaces of the molding cavity formed by the assembled mold sections.

3. Apparatus for shaping and vulcanizing an air spring which in its pre-vulcanized form has a flaring body of flexible, vulcanizable material terminating at one end in a relatively large bead and at the other end in a bead having a diameter substantially smaller than said large bead, said apparatus comprising first and second mold sections, and an intermediate mold section between said end sections, said end mold sections having relative axial movement whereby they may be moved toward each other in a closing movement to exert pressure on and to collapse said air spring axially, said first mold end section and said intermediate mold section having cooperating annular molding surfaces to mold the external surfaces of said large bead, said second mold end section having a central, axially extending portion with annular molding surfaces to shape and mold said small bead, means to bring said first and intermediate mold sections together to clamp and seal said large bead between said annular molding surfaces and to bring said second mold end section into forcible engagement with said small bead to initiate the axial collapse of said air spring, and to move the bead-engaging surfaces of said second end section axially through said intermediate section, a mandrel extending into said mold from said first end section to engage said small bead and force it against the annular molding surfaces of said axially extending portion, and means to apply fluid pressure to the interior of said air spring as said axial collapse progresses, whereby to expand the wall of said air spring outwardly during the closing movement of said mold sections and to force it against the surfaces of the molding cavity formed by the assembled mold sections.

4. Apparatus for shaping and vulcanizing an air spring which in its pre-vulcanized form has a flaring body of flexible, vulcanizable material terminating at one end in a relatively large bead and at the other end in a bead having a diameter substantially smaller than said large bead, said apparatus comprising first and second mold end sections, and an intermediate mold section between said end sections, said end mold sections having relative axial movement whereby they may be moved toward each other in a closing movement to exert pressure on and to collapse said air spring axially, said first mold end section and said intermediate mold section having cooperating annular molding surfaces to mold the external surfaces of said large bead, said second mold end section having a central, axially extending portion with annular molding surfaces to shape and mold said small bead, means to bring said first and intermediate mold sections together to clamp and seal said large bead between said annular molding surfaces and to bring said second mold end section into forcible engagement with said small bead to initiate the axial collapse of said air spring, and to move the bead-engaging surfaces of said second end section axially through said intermediate section, a mandrel extending into said mold from said first end section to support said small bead and force it against said second annular molding surfaces, means to allow said mandrel to yield during the closing movement of said mold and then to become stationary to apply full molding pressure to said bead, and means to apply fluid pressure to the interior of said air spring as said axial collapse progresses, whereby to expand the wall of said air spring outwardly during the closing movement of said mold sections and to force it against the surfaces of the molding cavity formed by the assembled mold sections.

5. Apparatus for shaping and vulcanizing an air spring which in its pre-vulcanized form has a flaring body of flexible, vulcanizable material terminating at one end in a relatively large bead and at the other end in a bead having a diameter substantially smaller than said large bead, said apparatus comprising first and second mold end sections, and an intermediate mold section between said end sections, said end mold sections having relative axial movement whereby they may be moved toward each other in a closing movement to exert pressure on and to collapse said air spring axially, said first mold end section and said intermediate mold section having cooperating annular molding surfaces to mold the external surfaces of said large bead, said second mold end section having a central, axially extending projection with annular molding surfaces to shape and mold said small bead, means to bring said first and intermediate mold sections together to clamp and seal said large bead between said first annular molding surfaces and to bring said second mold end section into forcible engagement with said small bead to initiate the axial collapse of said air spring, and to move the bead-engaging surfaces of said second end section axially through said intermediate section, a mandrel extending into said mold from said first end section to support said small bead and force it against the annular molding surfaces of said projection, said projection extending through said annular molding surfaces for said large bead when said mold is closed, and means to apply fluid pressure to the interior of said air spring as said axial collapse progresses, whereby to expand the wall of said air spring outwardly during the closing movement of said mold sections and to force it against the surfaces of the molding cavity formed by the assembled mold sections.

References Cited in the file of this patent

UNITED STATES PATENTS

| | | |
|---|---|---|
| 2,221,470 | Brown | Nov. 12, 1940 |
| 2,226,605 | Geyer et al. | Dec. 31, 1940 |
| 2,243,532 | Maynard | May 27, 1941 |
| 2,571,258 | Kolins | Oct. 16, 1951 |
| 2,596,031 | Kaufman | May 6, 1952 |
| 2,730,763 | Brundage | Jan. 17, 1956 |
| 2,812,544 | Soderquist | Nov. 12, 1957 |
| 2,812,545 | Soderquist | Nov. 12, 1957 |